E. P. HUTCHINS.
SPRING TIRE.
APPLICATION FILED SEPT. 3, 1913.
1,142,327.
Patented June 8, 1915.
2 SHEETS—SHEET 1.
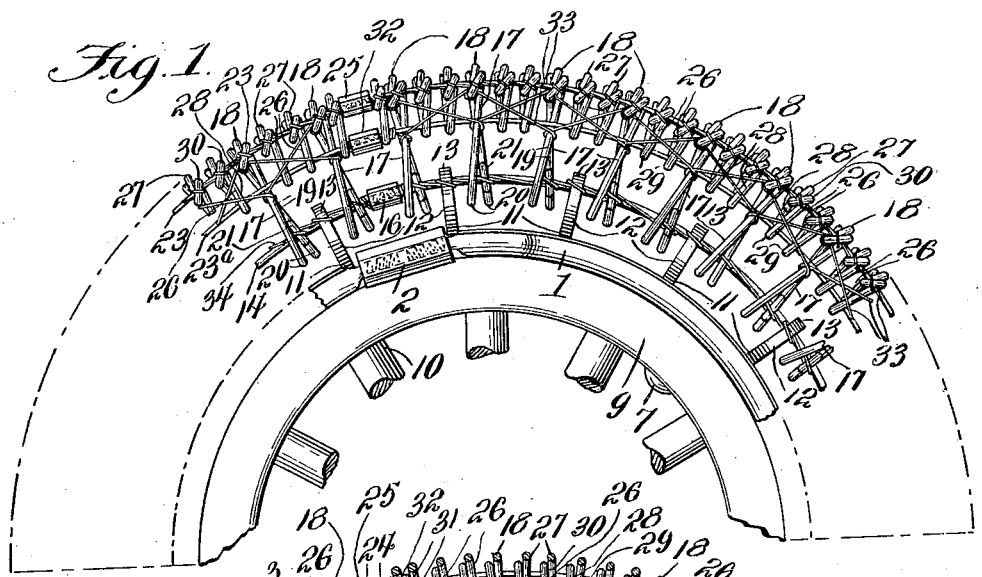
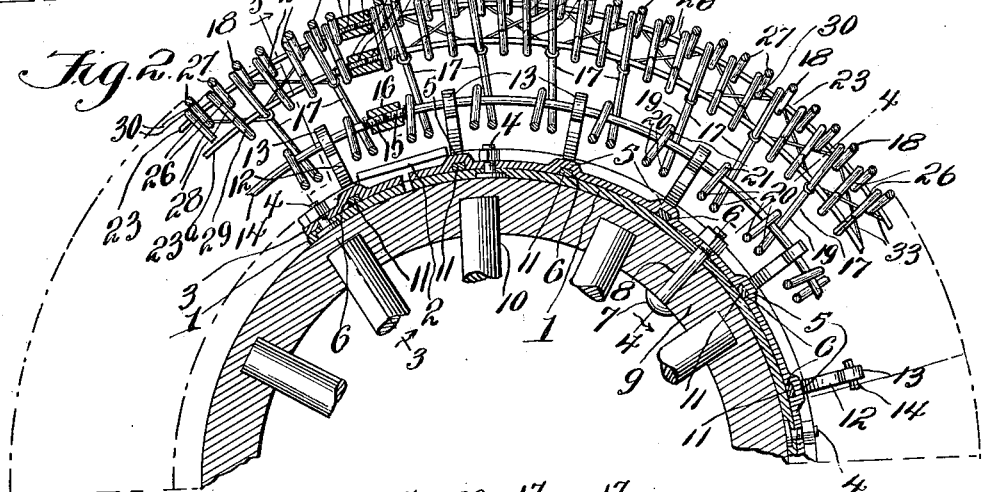
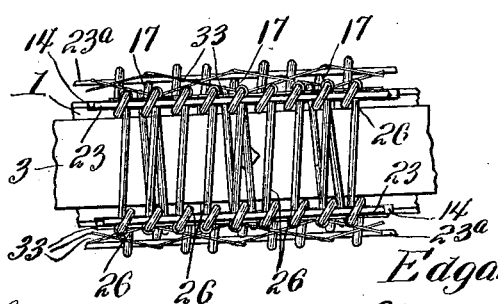
Witnesses
J. T. L. Wright
Geo. Ackman Jr.
Inventor
Edgar P. Hutchins
By Victor J. Evans
Attorney E. P. HUTCHINS.
SPRING TIRE.
APPLICATION FILED SEPT. 3, 1913.
1,142,327.
Patented June 8, 1915.
2 SHEETS—SHEET 2.
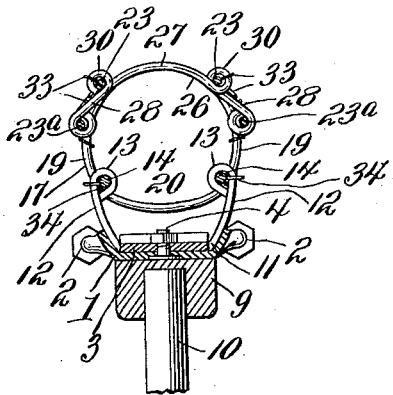
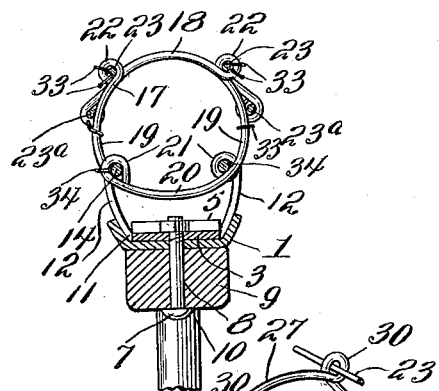
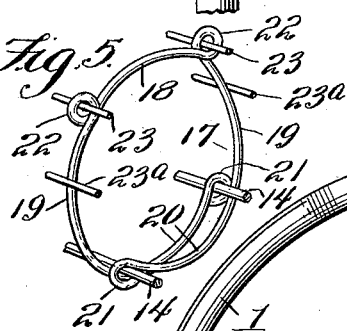
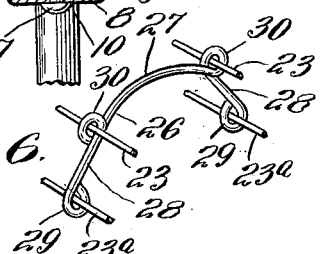
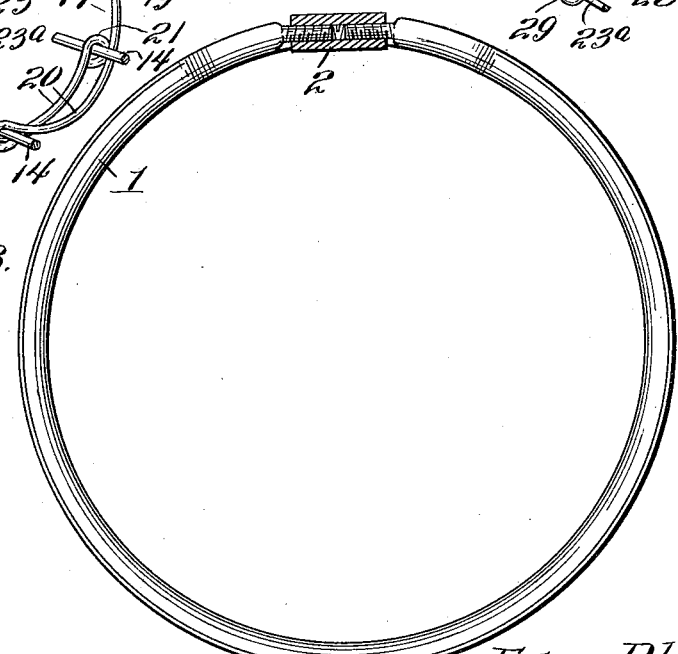
Inventor
Edgar P. Hutchins
By Victor J. Evans
Attorney
Witnesses

UNITED STATES PATENT OFFICE.

EDGAR P. HUTCHINS, OF BROOKVILLE, PENNSYLVANIA.

SPRING-TIRE.

1,142,327.  Specification of Letters Patent.  Patented June 8, 1915.

Application filed September 3, 1913. Serial No. 787,963.

*To all whom it may concern:*

Be it known that I, EDGAR P. HUTCHINS, a citizen of the United States, residing at Brookville, in the county of Jefferson and State of Pennsylvania, have invented new and useful Improvements in Spring-Tires, of which the following is a specification.

This invention relates to spring tires and has for its primary object the provision of a structure of this character which may be formed wholly of metal and which will consist of companion spring units arranged collectively in such manner as will permit the device to readily adapt itself to vehicle rims of standard formation.

Another object of the invention is the provision of means for facilitating the application of the tire to the rim or the removal of the same therefrom.

A still further object of the invention is the provision of a spring tire in which the spring units thereof are arranged to form tractor surfaces which will resist the skidding tendency of the wheel when operating over slippery highways.

A still further object of the invention is to provide a tire structure which will include resilient yokes for supporting the spring units and which are arranged so that their elasticity or resiliency may be contributed with that of the spring units so as to maximize the efficiency of the structure as a whole.

The invention consists of the novel features, details of construction and combination of parts, which hereinafter will be more particularly set forth, illustrated in the accompanying drawings, and subsequently claimed.

Referring to the drawings, forming a part of the specification, Figure 1 is a side view of a portion of the wheel showing parts in full lines and parts in dotted lines. Fig. 2 is a longitudinal section therethrough. Fig. 3 is a section on the line 3—3 of Fig. 2. Fig. 4 is a section on the line 4—4 of Fig. 2. Fig. 5 is a perspective view of one of the spring units. Fig. 6 is a perspective view of one of the resilient supporting yokes. Fig. 7 is a top plan view of a portion of the tire. Fig. 8 is a side view of the annulus.

With a view to providing a tire structure which may be constructed wholly of metal and which will possess a high degree of elasticity and constructed so that the shocks and jars will be effectually absorbed, I employ an annulus 1 split transversely and provided at its meeting ends with mating threaded elements of turnbuckles 2, whereby the annulus is susceptible of expansion and contraction to permit the device to readily adapt itself to the form of an ordinary vehicle rim and to properly repose thereagainst. The annulus is embraced by a metallic member 3 secured to the annulus by means of bolts or equivalent fastenings 4 and provided at intervals with transversely arranged upstruck portions 5 which form intervening passages 6 between said annulus 1 and the adjacent member 3, as clearly illustrated in Fig. 2. In order that the annulus may be held against creeping around the rim I employ a fastening bolt 7 which is extended through the annulus and through said member 3 and through a radial opening 8 in the rim 9 of the wheel 10 conventionally shown in Fig. 1.

The spring yokes or hangers 11 of substantially U form are extended through the passages 6 between the annulus 1 and the member 3 and are provided with side branches 12, which are bowed outwardly and then inwardly and which terminate in eyes or loops 13, the eyes of one yoke being alined with the eyes of adjacent yokes on a line drawn substantially concentric with the annulus. The slightly resilient split rings 14 are extended through the alined eyes 13 and provided with meeting threaded ends 15 for the reception of adjusting nuts 16 so that said threaded ends may be moved relatively when effecting the required connection of the structure with the rim of the wheel.

The spring units 17 are each constructed from a single length of resilient wire and bent to form an arcuate tread 18, bowed sides 19 and reversely extended bowed terminals 20 having eyes 21 respectively receiving the rings 14. The portions or terminals 20 are bowed in the direction of the annulus and are normally spaced therefrom, whereby they are permitted to move relatively thereof under the action of the springs. At the juncture of the portions 18 of the spring units with the sides 9 are formed eyes 22 through which are extended split rings 23, which are spaced from the rings 14 and provided at their meeting ends with threaded portions 24 which receive adjusting nuts 25.

The tread forming portions of the spring units are arranged in parallel relation and interposed between adjacent units are other tread elements 26 that are also constructed of spring wire and each is provided with a bowed effective tread portion 27 and side branches 28. These branches are provided with terminal eyes 29, which receive the rings 23$^a$, while at the juncture of the branches 28 with the portions 27 are formed eyes 30 which are alined with the eyes 22 of the spring units and which receive therewith said rings 23. The mentioned rings 23$^a$ are substantially like the rings 23 and 24 and they are provided with threaded ends 31 connected by adjusting nuts 32. The effective treads 27 are held in proper spaced relation from the treads 18 of the spring units by means of wires 33 that are laced around the rings 23 and 23$^a$ and extended through the eyes 22 and 30. In addition to this means additional wires 34 are wrapped around the rings 14 and extended through the eyes 21, as illustrated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new, is:—

1. A tire comprising an annular member, spring yoke members carried by the annular member and arranged in spaced relation, the branches of each yoke member extending upwardly and terminating in eyes, a plurality of substantially circular spring units interposed between the adjacent yoke members and each having an upper and lower pair of eyes formed thereon, the eyes on one unit being in line with the corresponding eyes on the adjacent units, and the lowermost pair of eyes on each unit being in line with the eyes on the branches of the yoke members, adjustable ring members extending through the lower pair of eyes on the units and through the eyes on the branches of the yoke members, substantially semi-circular units interposed between the circular units and each having formed thereon an upper and lower pair of eyes, the upper pair of eyes of each of the semi-circular pairs of units being in line with the upper pair of eyes on the circular units, rings extending through the upper pairs of eyes of the circular and semi-circular units and rings extending through the lower pairs of eyes of the semi-circular units, as and for the purpose specified.

2. A tire comprising an annular member, spring yoke members carried by the annular member and arranged in spaced relation, the branches of each yoke member extending upwardly and terminating in eyes, a plurality of substantially circular spring units interposed between the adjacent yoke members and each having an upper and lower pair of eyes formed thereon, the eyes of one unit being in line with the corresponding eyes on the adjacent units, and the lowermost pair of eyes on each unit being in line with the eyes on the branches of the yoke members, adjustable ring members extending through the eyes on the branches of the yoke members, substantially semi-circular units interposed between the circular units and each having formed thereon an upper and lower pair of eyes, the upper pair of eyes of each of the semi-circular units being in line with the upper pair of eyes of the circular units, rings extending through the upper pairs of eyes of the circular and semi-circular units, rings extending through the lower pair of eyes of the semi-circular units, and means associated with the first and second mentioned units for holding the respective units in spaced relation.

In testimony whereof I affix my signature in presence of two witnesses.

EDGAR P. HUTCHINS.

Witnesses:
  H. H. BROSIUS,
  GLADSTONE A. CARMALT.

Copies of this patent may be obtained for five cents each, by addressing the "Commissioner of Patents, Washington, D. C."